United States Patent [19]
Maly

[11] 3,998,272
[45] Dec. 21, 1976

[54] METHOD OF ACIDIZING WELLS

[75] Inventor: George P. Maly, Newport Beach, Calif.

[73] Assignee: Union Oil Company of California, Brea, Calif.

[22] Filed: Apr. 21, 1975

[21] Appl. No.: 569,877

[52] U.S. Cl. .............................. 166/281; 166/282; 166/283
[51] Int. Cl.² ................. E21B 43/26; E21B 43/27; E21B 33/138
[58] Field of Search .......... 166/282, 283, 307, 308, 166/280, 281, 294, 295

[56] References Cited
UNITED STATES PATENTS

| | | |
|---|---|---|
| 3,316,967 | 5/1967 | Huitt et al. ....................... 166/280 |
| 3,363,690 | 1/1968 | Fischer ............................. 166/280 |
| 3,481,401 | 12/1969 | Graham ............................ 166/280 |
| 3,500,929 | 3/1970 | Eilers et al. .................... 166/282 X |
| 3,711,405 | 1/1973 | Pye et al. ......................... 166/282 |
| 3,724,549 | 4/1973 | Dill .................................... 166/282 |
| 3,768,564 | 10/1973 | Knox et al. ...................... 166/307 |
| 3,779,915 | 12/1973 | Kucera ......................... 166/282 X |
| 3,827,498 | 8/1974 | Crowe .............................. 166/282 |

*Primary Examiner*—Stephen J. Novosad
*Attorney, Agent, or Firm*—Richard C. Hartman; Dean Sandford; Gerald L. Floyd

[57] ABSTRACT

A process using discrete solid particles of polyvinyl acetate as diverting agents in acid treating subterranean geological formations penetrated by a well.

18 Claims, No Drawings

METHOD OF ACIDIZING WELLS

BACKGROUND OF THE INVENTION

1. Field of the Invention

This invention relates to a method of acidizing wells, and more particularly to a method of acidizing which provides proper diversion of the acidizing solution into a heterogeneous subterranean formation penetrated by a well.

2. Description of the Prior Art

Many reservoirs which require workover operations or stimulation do not have uniform permeability throughout but instead exhibit heterogeneity. By heterogeneity, it is meant that the reservoir is comprised of stratified layers of varying permeability, or that it contains fractures, cracks, fissures, streaks, vuggs, or zones of varying permeability that cause injected fluids to advance through the reservoir nonuniformity. Thus, in treating formations that have strata or zones of different permeabilities, or which otherwise are structurally faulted so that injected treating fluid does not advance through the formation at a substantially uniform rate, it is often desirable to divert the treating fluid from the more highly permeable portions of the formation into less permeable portions of the formation. In the past, this diversion has been primarily accomplished by pumping a volume of treating fluid into the formation, then following it with a diverting agent suspended in a carrier fluid to seal off the portion of the formation where the first treating fluid penetrated, and then following the diverting agent with a second stage of treating liquid which would be forced into another portion of the formation. The carrier fluid containing the diverting agent flows most readily into the portion of the formation having the largest pores, fissures, and vuggs until the diverting agent bridges on the face of that portion of the formation and forms a relatively impermeable filter cake, thus diverting the remaining fluid to the next most permeable portion of the formation. These steps may be repeated until the desired number of stages of treating fluid have been injected. Alternatively, the diverting agent may be dispersed in the treating fluid for progressive diversion throughout the treating operation.

However, after either stage or progressive treatments, the diverting agent must be removed to allow the oil to flow into the well. This is usually accomplished by selecting diverting agents that will dissolve in the formation fluids or in the treating fluids, or diverting agents which will melt or sublime at formation temperatures.

A great variety of diverting agents have been used to plug formation openings and to divert treating liquids to other zones of a formation. Wax beads, naphthalene particles, or benzoic acid in the form of finely divided particles and as flakes, and sodium chloride, as graded rock salt, are conventionally used as diverting agents. Additionally, a number of fibrous and granulated materials such as asbestos, cotton fibers, cellophane flakes, chopped rope, cereal grains, mica, synthetic and natural polymers, and the like have been employed as diverting agents.

A myriad of prior art materials used as diverting agents all have at least one or more of the following disadvantages especially when used in conjunction with acidizing of oil-bearing formations: (1) extremely low or slow solubility in formation hydrocarbons, i.e., hydrocarbon oils or gases; (2) excessive solubility in formation hydrocarbons; (3) extremely high costs; (4) random particulate structure having poor packing or sealing characteristics and being difficult to inject into the formation by pumping because of bridging in the well; (5) non-reversibility in sealing or plugging characteristics, i.e., difficulty in removing the plug or bridge; (6) non-selective plugging characteristics; (7) densities lighter than the treating fluid causing the particles to float therein, whereby the particles fail to reach the intended zones; (8) improper size or shape of the diverting agent; and (9) in acid-treating operations the diverting agent may be attacked and dissolved by the acidizing solution.

Thus there exists a need for a diverting agent, particularly for use in acidizing operations, which overcomes the aforementioned deficiencies of these materials.

Accordingly a principal object of this invention is to provide a method of acidizing heterogeneous formations.

Another object is to provide such a method wherein the acidizing solution is diverted from the more permeable portions of the formation to the less permeable portions of the formation during the acidizing treatment.

A further object is to provide such an acidizing solution wherein the diverting agent employed is removed from the oil-producing portions of the formation following the acidizing treatment by dissolving in the oil.

A still further object is to provide an acidizing solution containing a diverting agent which diverting agent tends to predominantly bridge on the face of the formation rather than enter the pores of the formation.

Other objects, advantages and features of the invention will become apparent from the following description and appended claims.

SUMMARY OF THE INVENTION

These problems can be largely overcome in the acid treatment of subterranean formations by temporarily bridging or plugging the more permeable zones of the formation with discrete, solid, spherical beads of polyvinyl acetate.

DESCRIPTION OF THE PREFERRED EMBODIMENTS

In accordance with this invention the polyvinyl acetate beads can be added to the acid-treating fluid before it is injected into the well, or they can be added continuously as the acid-treating fluid is pumped into the well, or they can be dispersed in a carrier fluid and added between stages of the acid treatment. For example, in acidizing procedures where the diverting agent is suspended in the aqueous acidizing solution before injection into the well, the diverting agent will progressively plug off portions of the formation being treated, thereby frustrating the tendency of the acid to flow only into the most permeable portions of the formation and, instead, create an evenly acidized formation. When the treating fluid is pumped in stages, the first stage of aqueous acid solution is followed by a volume of treating fluid composed of a carrier fluid containing the spherical beads of polyvinyl acetate suspended therein. The polyvinyl acetate beads seal off the portion of the formation penetrated by the first stage of the treating fluid. The second stage of the aqueous acid solution is then pumped into another portion of the formation. Alternating volumes of treating fluid and diverting material may be continued to provide a uniformly acidized formation.

It is postulated that the diverting agent functions as follows. The particle size range of the diverting agent is selected so that most of the particles are larger than the pores of the formation being treated. When a suspension of the diverting agent in an acidizing solution or a carrier fluid is injected into a formation, the particles tend to filter out and bridge on the face of the formation and enter the pores of the formation to only a limited extent. Since the diverting agent is preferably present in a range of particle sizes, the filter cake formed on the face of the formation has low fluid permeability. Thus, additional fluid being injected will be diverted from the first formation penetrated into successively less permeable portions of the formation.

The phenomenon of the diverting agent mostly bridging on the face of the formation rather than entering the pores of the formation is believed to be important when it is desired to remove the diverting agent, as in subsequently producing fluids through the formation. Apparently when a particle of diverting agent is first exposed to a fluid in which it is soluble, such as oil in the formation, the particle swells prior to dissolving. If a large amount of diverting agent is present in the pores of the formation, the particles may swell and seal off the pores before the particles can dissolve. However the diverting agent particles making up the filter cake on the formation face are not restricted by walls of the pore and can easily swell and then dissolve when contacted by oil.

The solid, spherical beads of polyvinyl acetate can be used in both "matrix acidizing" and in "fracture acidizing". Injecting an acidizing solution into a formation at injection rates below fracture pressure is termed matrix acidizing, while injecting at above fracture pressure whereby fractures are formed in the formation is termed fracture acidizing. The technique of continuously introducing the polyvinyl acetate beads into the aqueous acid-fracturing fluid may be used for the fracturing treatments; or they can be added to the aqueous acid-fracturing fluid in slugs during fracturing operations. The acid-fracturing fluid preferentially flows into that portion of the subterranean formation which most readily accepts it. After the fracture is formed, the polyvinyl acetate beads may be added to the fracturing fluid. Because the acid-fracturing solution is preferably flowing into the fractured zone, it will carry the polyvinyl acetate beads with it. The fractured zone is thereby plugged and the acid-fracturing fluid is diverted to that portion of the formation next most susceptible to fracturing. This method of fracturing and diverting may be repeated to obtain multiple fractures.

Polyvinyl acetate homopolymer suitable for use in this invention is in the form of small glass-like spherical beads of varying sizes which are oil-soluble, water-insoluble, and have densities above 1.0, and preferably above about 1.19. Spherical beads are readily made by well known polymerization techniques, such as by emulsion or bead polymerization. It has been found that the aforementioned useful properties of the polyvinyl acetate beads provide an excellent acid diverting agent which overcomes the disadvantages of prior art materials used for this purpose. For example, the relatively high density of the polyvinyl acetate beads assures that beads are suspended in and do not float on the treating fluid. This phenomenon allows the diverting agent beads to each the intended permeable zones more uniformly, and to more selectively plug the desired permeable zone. Furthermore, the spherical beads of polyvinyl acetate are relatively inert to conventional aqueous acidizing solutions used in well treating, and may be used as diverting agents in wells having bottom hole temperatures from below 40° F. to about 300° F. The solubility characteristics of the polyvinyl acetate beads make them an extremely suitable material for use as temporary diverting agents. The beads are water-insoluble and have an ideal rate of dissolution in formation fluids. Furthermore, they are completely soluble in aromatic hydrocarbons, chlorinated hydrocarbons, alcohols, glycols, ketones, oxides, ethers and esters. Another advantage is that the spheroidal shape of the polyvinyl acetate homopolymer allows the particles to pass readily through the slots in slotted well liners.

The particle size distribution of the graded homopolymer is important. It is preferred that any given sample of useful beads have an accumulative percentage of beads of various mesh sizes, starting with the smallest mesh sizes within the following limits:

| FOR ACID FRACTURING | |
|---|---|
| greater than 2 mesh | about 10% to about 30% |
| greater than 4 mesh | about 20% to about 65% |
| greater than 10 mesh | about 28% to about 82% |
| greater than 20 mesh | about 43% to about 95% |
| greater than 40 mesh | about 71% to about 98% |
| FOR MATRIX ACIDIZING | |
| greater than 20 mesh | about 15% to about 75% |
| greater than 40 mesh | about 28% to about 86% |
| greater than 80 mesh | about 47% to about 93% |
| greater than 140 mesh | about 68% to about 98% |
| greater than 180 mesh | about 82% to about 99% |

All mesh sizes referred to are U.S. Standard sieve sizes.

Although some plugging will be accomplished by other distributions of particle sizes, the preferred particle size of the solid spherical beads of polyvinyl acetate should be graded from about 2 mesh to about 40 mesh for acid fracturing treatments and 20 mesh to about 180 mesh for matrix acidizing.

The amount of polyvinyl acetate beads required will depend upon the type of treatment. For example, for matrix acidizing as little as 0.05 pounds/stage or 0.01 to 10 pounds/gallon carrier liquid will be necessary. The required quantity of beads will also vary with the type of well completion. The largest amounts will be required in open hole completions, the smallest amounts in perforated completions, and intermediate amounts in slotted liner completions.

In another embodiment of the invention involving a multi-state operation, a carrier fluid in which the diverting agent particles are dispersed is injected either as a first stage or following the initial acid stage. The carrier fluid must be one in which the polyvinyl acetate beads can be dispersed without solubilizing during the diverting operations. In the preferred embodiment, the carrier fluid is the aqueous acid treating fluid. Water or brine can be used as the carrier fluid; and aliphatic hydrocarbons such as kerosene, diesel fuel and turbine fuel may also be employed. The water may have any pH, and may contain other components which will not react with the diverting agent. For example, surfactants can be helpful in dispersing the beads in either acid or other water-base liquids.

The polyvinyl acetate particles used in the practice of this invention are particularly useful as temporary propping and bridging additives for acid-fracturing fluids. The polyvinyl acetate homopolymer particles maximize fracture flow capacity and minimize flow into a completed fracture. With the use of the polyvinyl acetate homopolymer temporary plugging additive, a substantially greater efficiency can be achieved for acid-fracturing. The homopolymer particles of this invention can also be conveniently mixed with a carrier fluid in the same manner as other propping agents, and the resulting mixture is then employed in conventional fracturing operations, usually at selected elevations in the formation. The preferred temporary propping and plugging elements of this invention are spheroidal in shape and deformable under pressure so that they are ideally suited for placement along with permanent propping agents, and for forming stable bridges and temporary seals across openings in the formation matrix. For example, the formation can be plugged or sealed off by the polyvinyl acetate particles in the initial stage of the fracturing operation, and then a deep-penetrating fracture induced by pumping a fracturing fluid at a higher rate and higher pressure. Then, when a new fracture in this multiple fracture operation is formed, polyvinyl acetate particles in admixture with a permanent propping agent are thrust deep into the new fracture and function there as a temporary propping agent. The fracturing fluid pressure and rate are then reduced to permit the overburden pressure partially to close the fracture to the height of the propping agent. A fluid suspension of the polyvinyl acetate polymer particles alone can then be used to form a new temporary seal across the partially closed fracture opening in the matrix. Once again the pressure and flow rate of the fracturing fluid is then increased to bring about fracturing in a new location, since leak-off is minimized through the sealed fractures.

One of the required characteristics of the homopolymer particles used as a temporary propping agent and seal in fracturing is that of retaining their shapes and sizes when exposed to oil for a period sufficiently long to permit the fracture to be formed, yet being sufficiently soluble in oil to disintegrate or dissolve completely and readily when the fracture treatment is completed. The temporary propping and sealing material of this invention has the further particularly advantageous feature of being readily removed from the fracture, and from the well bore, by solution in formation hydrocarbons.

At the completion of the fracturing operation, it has been found advantageous to inject a final or tail-in plugging or sealing portion of polyvinyl acetate spheroids to temporarily seal the open ends of the fractures nearest the well. This tail-in sealing plug is thus similar to the final sealing step previously discussed with regard to forming multiple fractures. The flow of sand into the well bore from the formation is thereby minimized and the phenomenon known as "sand-out" of the well is prevented. Thus, sand bailing can be readily accomplished in a few hours, radioactive logging, when required, can be carried out the same day as the fracturing operation, and the well can be placed on production with little delay.

In conducting a typical acid-fracturing operation, an acidizing fluid such as an aqueous hydrochloric acid solution, is injected under pressure. After the initial acid-fracturing step, a carrier fluid such as kerosene in which polyvinyl acetate spheroids are suspended, is pumped down the well. The fluid containing the spheroids flows out into the fissures existing in both water and oil-producing zones. Depending upon the size of the existing pores or fissures and the size distribution of the spheroids, the homopolymer particles lodge at some point in the existing openings and create a very large resistance to further fluid flow. Additional acid-fracturing fluid, at high flow rates such as several hundreds to several thousands of gallons per minute and high pressures such as several thousand pounds per square inch, is then pumped through the well and into the formation. This acid-fracturing step serves to fracture the formation, creating extensive cracks through which higher oil recovery and/or injection rates can be realized. The higher flow rates inherent in acid fracturing are thus improved because the polyvinyl acetate spheroids dissolve in the formation hydrocarbons after a short time, and are removed from the formation with the produced hydrocarbons.

A still further advantage of fracturing with a combination of both sand, or other permanent propping agents, and polyvinyl acetate spheroids is that, while the spheroids do not prevent the sand from being crushed when the pressure is first released on the fracture, the deformable characteristics of the polyvinyl acetate particles or spheroids tend to maintain the crushed pieces of sand closely packed together. Thus, the effectiveness of the permanent propping agent is not completely lost by the effect of the overburden pressure, although some crushing takes place on reducing the hydraulic pressure at the completion of the fracturing operation. The temporary propping elements, i.e., the polyvinyl acetate particles, are readily removed from the fracture by dissolution in the produced hydrocarbons, thus leaving only a highly porous partial mono-layer of permanent propping agent in the fracture. Also, the polyvinyl acetate spheroids used for temporary propping exhibit substantial physical strength which aids the permanent propping agents in initially supporting the overburden load. In the placement of a mono-layer of propping agent in horizontal fractures, the spheroidal shape permits rolling and thus contributes markedly to the ease and density of placement, although other shaped particles are operable for any temporary propping service.

It has been found that the addition of any amount of the polyvinyl acetate polymer particles to the carrier fluid is helpful during the propping step in fracturing operations. A preferred concentration of polyvinyl acetate-polymer particles as a temporary sealing additive is between about 0.35 and about 3.0 pounds of polyvinyl acetate solids per gallon of carrier fluid, but when the polyvinyl acetate particles are used as temporary propping agents, the concentration is usually higher, e.g., 1 to 5 pounds per gallon of carrier fluid. The proportion of temporary propping agents to permanent propping agents in a propping mixture is usually selected so that after removal of the fracturing pressures and dissolution of the temporary propping agent, the remaining propping agent has sufficient crushing strength to resist the overburden pressure and hold the fracture open to the maximum fracture flow capacity. Usually, the temporary propping agent particles comprise not more than half of the total number of propping agent particles. Permanent propping materials which typically are used in combination with the polyvinyl acetate spheroid particles of this invention are strong hard solids which are chemically inert and resistant to solvent action and elevated downhole temperatures, preferred materials being solids such as ground nut shells, e.g., walnut shells, peach seeds, plastic, coarse sand, or the like. Preferably, all propping agent particles, both temporary and permanent, used in this invention are spheroidal in shape to enhance placement in the formation fissures.

When used as propping agents, the polyvinyl acetate particles are preferably not only spheroidal, but it is also preferred that the size range for each step of a fracturing operation be relatively narrow and uniform. Thus, for admixture with the permanent propping agent, the temporary propping agent particles should be substantially the same size as the permanent propping agent, and normally range from about 2 mesh to about 100 mesh U.S. Standard sieve. The most commonly used sizes are 8 mesh to 12 mesh U.S. Standard sieve or 12 mesh to 20 mesh U.S. Standard sieve, the particular range used depending on the type of formation being fractured. In contrast, when the polyvinyl acetate particles are used for sealing in this invention, they are preferably provided in a relatively broad gradation of particle sizes. Bridging is improved by a wide range of particle sizes, and typical sealing or plugging materials used in all of the oil well and oil formation treating processes where plugging or sealing is predominant usually have a gradation of particle sizes between the range of about 2 mesh about 100 mesh U.S. Standard sieve. However, much larger particles can be used for filling formation caverns and much smaller particles can be used for sealing formation pores. Usually for sealing and plugging, the polyvinyl acetate polymer particle size distribution is adjusted such that the particles in the range of about 2 mesh to about 20 mesh U.S. Standard sieve constitute about one half of the material and the particles in the range of about 20 to about 100 mesh U.S. Standard sieve constitute the other half of the material.

The solid spherical beads of polyvinyl acetate useful in the practice of the present invention may be used with any conventional acidizing solution capable of attacking and dissolving the subterranean formation. Suitable acids are hydrochloric, hydrochloric-hydrofluoric, polyphosphoric, acetic, formic, chloroacetic, citric, lactic, oxalic and sulfamic. For conventional acidizing "regular HCl acid" is used in the field. This is an aqueous solution normally containing 15 weight percent of hydrochloric acid, but concentrations may vary from 3 to 37 percent. The mixed hydrofluoric-hydrochloric acid typically used in oil wells is usually 3 to 8 percent hydrofluoric acid combined with 3 to 15 percent hydrochloric acid. It is used exclusively in sandstone matrix treatments, or to remove mud damage. The aqueous acid solution described above will normally contain conventional acid inhibitors generally used in an acidizing solution. Acetic acid and formic acid are weakly ionized, slowly-reacting, organic acids. Acetic acid is inherently retarded, and can be left in contact with pipe for days without seriously damaging casing or tubing. Formic acid is more difficult to inhibit against corrosion at higher temperatures. Also other conventional additives such as surface active agents, suspending agents, sequestering agents, and antisludge agents may be employed. A wide variety of additives designed to perform these and related function are available commercially and will be familiar to those skilled in the art.

The following examples are illustrative of the invention but are not intended as limitations thereof:

EXAMPLE 1

This example illustrates the use of the method of this invention in matrix acidizing a subterranean, oil-bearing reservoir to stimulate the recovery of oil therefrom. The well is completed in a relatively shallow reservoir having a temperature of 132° F. with a total productive interval of 12 feet perforated with two holes per foot at depths of 3,075 to 3,081 feet and 3,091 to 3,097 feet. The stimulation treatment is performed by injecting a total of 3,000 gallons of 15 weight percent hydrochloric acid and 9 weight percent hydrofluoric acid plus 6 pounds sodium arsenite corrosion inhibitor. The initial slug 1,000 gallons of fluid acid is injected into the well under a vacuum. Next a second slug of acidizing solution containing diverting agent is prepared by mixing 2,000 pounds VINAC B-100 polyvinyl acetate spherical beads having a particle size of less than eight mesh U.S. Standard sieve series, into 1,000 gallons of fluid inhibited acid. A 10 percent by weight solution of VINAC B-100 polyvinyl acetate in benzene has a molal viscosity of from 90 to 100 centipoises as determined on a Brookfield Viscometer, Model RVO, at 20° C. with a No. 2 spindle at 20 rotations per minute. VINAC is a trademark of Air Products and Chemicals Incorporated. This second slug is then injected into the formation. As soon as the slug reaches the formation sands the pressure increases to 1,000 pounds per square inch (p.s.i.). After a short period of time the pressure drops to 500 p.s.i. This indicates that the acid is diverted from the first permeable sand to another less permeable sand and the pressure drop shows opening of the other sand. A third 1,000 gallon slug of inhibited acidizing solution containing diverting agent is prepared and injected in the same manner as described above for the second slug. Thereafter the acid is displaced with an inert, clean turbine fuel. After well stabilization the sustained production rate of oil is observed and found to be substantially higher than the rate prior to the stimulation treatment. This indicates that the stimulation treatment is successful and that the diverting agent particles are substantially removed from the oil producing zones.

EXAMPLE 2

This example illustrates the use of the method of this invention in fracture acidizing a subterranean oil producing formation. A production well is completed in a relatively shallow reservoir having a temperature of 130° F. with a total productive interval of 15 feet perforated with two holes per foot at depths of 2,903 to 2,908 feet and 2,918 to 2,928 feet. The initial fracture is formed by the following procedure.

1. A spearhead injection of 3,000 gallons of an aqueous acid solution comprising 28 weight percent hydrochloric acid plus 6 pounds sodium arsenite corrosion inhibitor is pumped into the formation under fracturing pressure. The initial portion of the acid fracturing fluid is injected at a pressure of 2,000 pounds per square inch (p.s.i.). After fracturing the injection pressure quickly dropped to 600 p.s.i., and the well started taking fluid on vacuum.

2. An additional injection of 5,000 gallons of 40° API lease crude containing about 4 pounds per gallon of small, solid particles of sand suspended therein is injected at a pressure of 2,000 p.s.i., the injection pressure quickly dropped to 600 p.s.i. and the well started taking fluid on vacuum.

3. 3,000 gallons of an aqueous acid fracturing fluid comprising 28 weight percent of hydrochloric acid plus 6 pounds of sodium arsenite and containing about 2 pounds per gallon of solid, spherical beads of VINAC B-100 polyvinyl acetate is injected at an initial pressure of 2,000 p.s.i., the injection pressure dropped 600 p.s.i. indicating that the diverting agent is effective.

A second stage fracture is formed by repeating the above fluid injections. Fluid injection rates average 16 to 18 barrels per minute at well head injection pressures of between 1,800 and 2,200 p.s.i. A third stage fracture is formed by repeating these injections at flow rates and pressures comparable to those encountered in the second stage fracturing. The acid fracturing fluid is flushed from the tubing into the formation, and the well is returned to service in conventional manner. The production rate of oil is observed and the increase is found to be about four fold higher than the 29 barrel per day production rate prior to fracturing. This indicates that the fracturing operation is successful and that the polyvinyl acetate particles are substantially removed from the oil-producing zones.

While particular embodiments of the invention have been described, it will be understood of course that the invention is not limited thereto since many obvious modifications can be made, and it is intended to include with this invention any such modifications as will fall within the scope of the claims.

Having now described the invention, I claim:

1. In the method of acidizing subterranean formations penetrated by a well in which a mineral acid-containing fluid is injected through the well and into contact with the subterranean formation at an elevated pressure higher than the pressure of the formation whereby the mineral acid-containing fluid is forced from the well into the formation, the improvement which comprises:
   a. injecting a dispersion of spherical-shaped discrete, solid, oil-soluble polyvinyl acetate particles in a carrier liquid as a slug before, following or between slugs of mineral acid-containing fluid, which particles filter out and bridge on the face of the formation and form a low fluid permeability filter cake on the face of the formation,
   b. subsequently injecting a further slug of a mineral acid-containing fluid which is diverted into less permeable portions of the formation, and
   c. finally contacting the polyvinyl acetate particles with an oil in which they are soluble.

2. The method according to claim 1 wherein the elevated pressure at which the mineral acid-containing fluid is injected into the formation is sufficiently high to fracture the formation.

3. The method according to claim 2 wherein the said polyvinyl acetate particles are of a broad gradation in particle size ranging from 4 to 100 mesh and are employed in an amount of from 0.35 to 3.0 pounds per gallon.

4. The method according to claim 2 wherein the mineral acid-containing fluid is selected from the class consisting of aqueous solutions of hydrochloric acid, admixtures of hydrochloric acid and hydrofluoric acid, polyphosphoric acid, acetic acid, formic acid, chloroacetic acid, citric acid, lactic acid, oxalic acid and sulfamic acid.

5. The method according to claim 1 wherein the carrier liquid is a mineral acid-containing fluid and the said polyvinyl acetate particles are dispersed substantially uniformly throughout all portions of the mineral acid-containing fluid.

6. The method according to claim 1 wherein the carrier liquid is selected from the class consisting of mineral acid-containing fluid, water, brine and aliphatic hydrocarbons.

7. In the method of matrix acidizing subterranean formations penetrated by a well in which a mineral acid-containing fluid is injected through the well and into contact with the subterranean formations at an elevated pressure sufficiently high to enable the mineral acid-containing fluid to penetrate the formation but less than the formation pressure, the improvement which comprises:
   a. injecting a dispersion of from 0.1 to 10 pounds per gallon of spheroidal-shaped, discrete solid, oil-soluble polyvinyl acetate particles having a density above about 1.19 grams per cubic centimeter and a particle size range of from 20 to 180 mesh in a carrier liquid selected from the class consisting of mineral acid-containing fluid, water, brine and aliphatic hydrocarbons, as a slug before, following or between slugs of mineral acid-containing fluid,
   b. subsequently injecting a further slug of a mineral acid-containing fluid which is diverted into less permeable portions of the formation, and
   c. finally contacting the polyvinyl acetate particles with an oil in which they are soluble.

8. The method according to claim 7 wherein all of the mineral acid-containing fluid contains the said polyvinyl acetate particles.

9. The method according to claim 7 wherein the mineral acid-containing fluid is selected from the class consisting of aqueous solutions of hydrochloric acid, admixtures of hydrochloric acid and hydrofluoric acid, polyphosphoric acid, acetic acid, formic acid, chloroacetic acid, citric acid, lactic acid, oxalic acid and sulfamic acid.

10. In the method of fracture acidizing subterranean formations penetrated by a well in which a mineral acid-containing fluid is injected through the well and into contact with the subterranean formations at a pressure sufficient to fracture at least one of the formations, the improvement which comprises:
   a. injecting a carrier liquid selected from the class consisting of mineral acid-containing fluid, water, brine and aliphatic hydrocarbons which carrier liquid contains a dispersion of from 1 to 5 pounds per gallon of permanent propping agent particles and from 1 to 5 pounds per gallon of temporary propping agent particles comprising spheroidal-shaped, discrete, solid oil-soluble polyvinyl acetate particles having a density above about 1.19 grams per cubic centimeter and a narrow particle size range of from 8 to 12 mesh or from 12 to 20 mesh, as a slug before, following or between slugs of mineral acid-containing fluid,
   b. subsequently injecting a further slug of a mineral acid-containing fluid which is diverted into less permeable portions of the formation, and
   c. finally contacting the polyvinyl acetate particles with an oil in which they are soluble.

11. The method according to claim 10 wherein the carrier liquid is a mineral acid-containing fluid and the said polyvinyl acetate particles are dispersed substantially uniformly throughout all portions of the mineral acid-containing fluid.

12. The method according to claim 10 wherein the mineral acid-containing fluid is selected from the class consisting of aqueous solutions of hydrochloric acid, admixtures of hydrochloric acid and hydrofluoric acid, polyphosporic acid, acetic acid, polyphosphoric acid, chloroacetic acid, citric acid, lactic acid, oxalic acid and sulfamic acid.

13. In the method of fracture acidizing subterranean formations penetrated by a well in which a mineral acid-containing fluid is injected through the well and into contact with the subterranean formations at a pressure sufficient to fracture at least one of the formations, the improvement which comprises:
   a. injecting as a diverting agent a dispersion of from 0.35 to 3.0 pounds per gallon of spheroidal-shaped, discrete, solid oil-soluble polyvinyl acetate particles having a density above about 1.19 grams per cubic centimeter and a particle size range of from 2 to 100 mesh in a carrier liquid selected from the class consisting of mineral acid-containing fluid, water, brine and aliphatic hydrocarbons, as a slug before, following or between slugs of mineral acid-containing fluid,
   b. subsequently injecting a further slug of a mineral acid-containing fluid which is diverted into less permeable portions of the formation, and
   c. finally contacting the polyvinyl acetate particles with an oil in which they are soluble.

14. The method according to claim 13 wherein the carrier liquid is a mineral acid-containing fluid and the said polyvinyl acetate particles are dispersed substantially uniformly throughout all portions of the mineral acid-containing fluid.

15. The method according to claim 13 wherein the mineral acid-containing fluid is selected from the class consisting of aqueous solutions of hydrochloric acid, admixtures of hydrochloric acid and hydrofluoric acid, polyphosphoric acid, acetic acid, formic acid, chloroacetic acid, citric acid, lactic acid, oxalic acid and sulfamic acid.

16. In the method of acidizing subterranean formations penetrated by a well in which a mineral acid-containing fluid is injected through the well and into contact with the subterranean formation at an elevated pressure higher than the pressure of the formation whereby the mineral acid-containing fluid is forced from the well into the formation, the improvement which comprises:
   a. injecting a dispersion of from 1 to 5 pounds per gallon of spherical-shaped discrete, solid, oil-soluble polyvinyl acetate particles and from 1 to 5 pounds per gallon of permanent propping agent particles in a carrier liquid as a slug before, following or between slugs of mineral acid-containing fluid, which polyvinyl acetate particles filter out and bridge on the face of the formation and form a low fluid permeability filter cake on the face of the formation,
   b. subsequently injecting a further slug of a mineral acid-containing fluid which is diverted into less permeable portions of the formation, and
   c. finally contacting the polyvinyl acetate particles with an oil in which they are soluble.

17. The method according to claim 16 wherein the polyvinyl acetate particles are from 8 to 12 mesh or from 12 to 20 mesh in size.

18. In the method of acidizing subterranean formations penetrated by a well in which a mineral-acid containing fluid is injected through the well and into contact with the subterranean formation at an elevated pressure sufficiently high to fracture the formation, the improvement which comprises:
   a. injecting a dispersion of from 0.35 to 3.0 pounds per gallon spherical-shaped, discrete, solid, oil-soluble polyvinyl acetate particles, half of the said polyvinyl acetate particles ranging in size from 2 to 20 mesh and half of the said polyvinyl acetate particles ranging in size from 20 to 100 mesh, in a carrier liquid as a slug before, following or between slugs of mineral acid-containing fluid, which particles filter out and bridge on the face of the formation and form a low fluid permeability filter cake on the face of the formation,
   b. subsequently injecting a further slug of a mineral acid-containing fluid which is diverted into less permeable portions of the formation, and
   c. finally contacting the polyvinyl acetate particles with an oil in which they are soluble.

* * * * *

UNITED STATES PATENT AND TRADEMARK OFFICE
CERTIFICATE OF CORRECTION

PATENT NO. : 3,998,272
DATED : December 21, 1976
INVENTOR(S) : GEORGE P. MALY

It is certified that error appears in the above-identified patent and that said Letters Patent are hereby corrected as shown below:

In claim 12, column 11, line 5, change "polyphosphoric", second occurrence, to read --formic--.

Signed and Sealed this

Twenty-second Day of March 1977

[SEAL]

Attest:

RUTH C. MASON
Attesting Officer

C. MARSHALL DANN
Commissioner of Patents and Trademarks